United States Patent [19]

Simonovich et al.

[11] Patent Number: 6,091,739
[45] Date of Patent: Jul. 18, 2000

[54] HIGH SPEED DATABUS UTILIZING POINT TO MULTI-POINT INTERCONNECT NON-CONTACT COUPLER TECHNOLOGY ACHIEVING A MULTI-POINT TO MULTI-POINT INTERCONNECT

[75] Inventors: Lambert Simonovich, Stittsville; Rodney David Pike, Nepean; Richard Ralph Goulette, Arnprior, all of Canada

[73] Assignee: Nortel Networks Corporation, Montreal, Canada

[21] Appl. No.: 08/962,291

[22] Filed: Oct. 31, 1997

[51] Int. Cl.[7] .................................................. H04L 12/43
[52] U.S. Cl. ........................................... 370/458; 375/220
[58] Field of Search ..................................... 370/257, 451, 370/458, 497; 375/220, 282, 219, 316, 257

[56] References Cited

U.S. PATENT DOCUMENTS

| | | |
|---|---|---|
| 3,619,504 | 11/1971 | DeVeer et al. ........................... 375/257 |
| 3,863,024 | 1/1975 | Caragliano et al. ..................... 375/257 |
| 4,029,902 | 6/1977 | Bell, Jr. et al. .......................... 370/497 |
| 5,365,205 | 11/1994 | Wong ....................................... 333/109 |
| 5,432,486 | 7/1995 | Wong ....................................... 333/109 |
| 5,638,402 | 6/1997 | Osaka et al. ............................. 375/257 |

*Primary Examiner*—Chau Nguyen
*Assistant Examiner*—Kim T. Nguyen

[57] ABSTRACT

A high-speed data bus utilizes non-contact coupler technology which allows point to multi-point broadcasting of a data signal to multiple sinks at very high (Gb/s) speeds. These point-to-multi-point data bus transmission lines can then be used to construct a higher order multi-point to multi-point data bus, without contention at the bus level, since data can be made to flow continuously along each transmission line. The non-contact technology is implemented as a series of taps on a transmission line; the taps operate by way of capacitive or inductive or directional coupling, which helps to isolate the transmission line from the loading effects of circuitry connected to the taps and permits low distortion and high speed operation. The transmission line may also be terminated in the same slot where it originates, and its outbound section may be etched on a single conductive layer in the backplane or midplane.

20 Claims, 2 Drawing Sheets

6,091,739

HIGH SPEED DATABUS UTILIZING POINT TO MULTI-POINT INTERCONNECT NON-CONTACT COUPLER TECHNOLOGY ACHIEVING A MULTI-POINT TO MULTI-POINT INTERCONNECT

FIELD OF INVENTION

The present invention relates to a high speed databus utilizing point to multi-point interconnect non-contact coupler technology achieving a multi-point to multi-point interconnect. It is particularly concerned with a fault tolerant, high speed, low latency bus allowing multiple circuit packs sharing a common backplane or midplane to be interconnected and have a multi-gigabit per second bandwidth.

BACKGROUND OF THE INVENTION

Non-contact, such as capacitive or inductive or directional, coupler technology has been suggested as a method of improving the performance and the functionality of data and communications interconnect busses. However, few practical means have been provided by which these capacitively or inductively or directionally coupled buses can provide multi-point to multi-point connections between various circuit packs connected to the bus.

U.S. Pat. No. 3,619,504 to De Veer et al. issued Nov. 9, 1971 discloses a high speed data transmission network employing directional coupling elements that are spaced along a transmission line to couple information from the transmission line to taps. De Veer discloses transmission lines with a single source and a plurality of sinks or, conversely, a single sink and plurality of sources. De Veer also discloses a dual multiplex system for interconnecting two source circuits with two sink circuits. Source elements are respectively connected to transmission lines. Spaced along each transmission line are two directional couplers, one connected to each sink circuit. Thus, a sink circuit is connected to more than one stub line and is capable of receiving signals originating from both sources.

U.S. Pat. No. 5,638,402 to Osaka et al. issued Jun. 10, 1997, discloses a bus transceiver or databus. It employs capacitive and inductive coupling between bus connector lines. Further, it discloses a plurality of two way circuits coupled through a non-contact bus.

U.S. Pat. No. 5,365,205 to Wong issued Nov. 15, 1994 discloses a backplane databus utilizing directional couplers. The transmission line or conductive loop is terminated by a termination resistor in the circuit card which includes the driver for the transmission line.

SUMMARY OF THE INVENTION

An object of the present invention is to provide an improved high speed databus utilizing point to multi-point interconnect non-contact coupler technology achieving a multi-point to multi-point interconnect. In one aspect a bus is provided that eliminates contention between signals transmitted along differential signal lines. This type of contention is typically found on a two-way bus.

In one aspect there is provided a databus comprising: at least one conducting layer; a plurality of slots; each slot having a plurality of terminals; one of said plurality of terminals comprising a source terminal for connection to a source; said source terminal connected to a transmission line; said transmission line, having an outbound portion and a return portion; said transmission line, along its outbound portion, being a part of a single conducting layer of said at least one conducting layer; said transmission line extending from the slot; another of said plurality of terminals comprising a sink terminal for connection to a sink; said sink terminal connected to a tap; said tap extending proximate to a transmission line originating from a different slot, said tap being coupled with a non-contact coupler to the transmission line originating from a different slot.

In another aspect there is provided a databus comprising: a first conducting layer and a second conducting layer separated by an insulating layer; a first slot having a plurality of terminals; one of said plurality of terminals comprising a first terminal for connection to a first source; said first source terminal connected to a first transmission line; said first transmission line extending from the first slot; said first transmission line having an outbound portion and a return portion; said first transmission line, along its outbound portion, being a part of the first conducting layer; another of said plurality of terminals of the first slot comprising a first sink terminal for connection to a first sink; said first sink terminal connected to a first tap; said first tap extending proximate to a second transmission line originating from a second slot, said first tap being coupled by a non-contact coupler to the transmission line originating from said second slot; said second slot having a plurality of terminals; one of said plurality of terminals comprising a second source terminal for connection to a second source; said second source terminal connecting to said second transmission line; said second transmission line having an outbound portion and a return portion; said second transmission line extending from the second slot; said second transmission line, along its outbound portion, being part of the second conducting layer; another of said plurality of terminals in the second slot comprising a second sink terminal for connection to a second sink; said second sink terminal connected to a second tap; said second tap extending proximate to a transmission line originating from a different slot, such that said second tap is coupled with a non-contact coupler to a transmission line originating from a different slot.

BRIEF DESCRIPTION OF DRAWINGS

The invention will be further understood with the following description with references to the drawings in which.

DETAILED DESCRIPTION OF THE PREFERRED EMBODIMENTS

A databus allows circuit packs, such as computer processors or memory, to exchange information by way of electric or electromagnetic signals. A databus has a number of connectors or slots where each individual circuit pack makes electrical connection with the databus. A slot is a series of terminals, typically in the nature of pinhole connectors, to receive a series of pins from a single circuit pack connector. A databus typically is made up of a number of alternating conducting and insulating layers with each conducting layer having a series of conducting traces. When a circuit pack connector is inserted into a slot, each pin enters a pinhole and makes connection with one terminal on each of the conducting layers. The location on the conducting trace where the electrical connection is made with the pin is a terminal. A pin will typically pass through a number of conducting and insulating layers. Where there is no electrical connection desired between a terminal and another part of a conducting layer, there is no conducting trace etched between the terminal and any other part of that conducting layer. Alternatively, a pin may be permanently attached to a terminal and extend through other layers and the surface of the databus. Such a pin is then inserted into a pinhole connector in a circuit pack.

Figure 1:
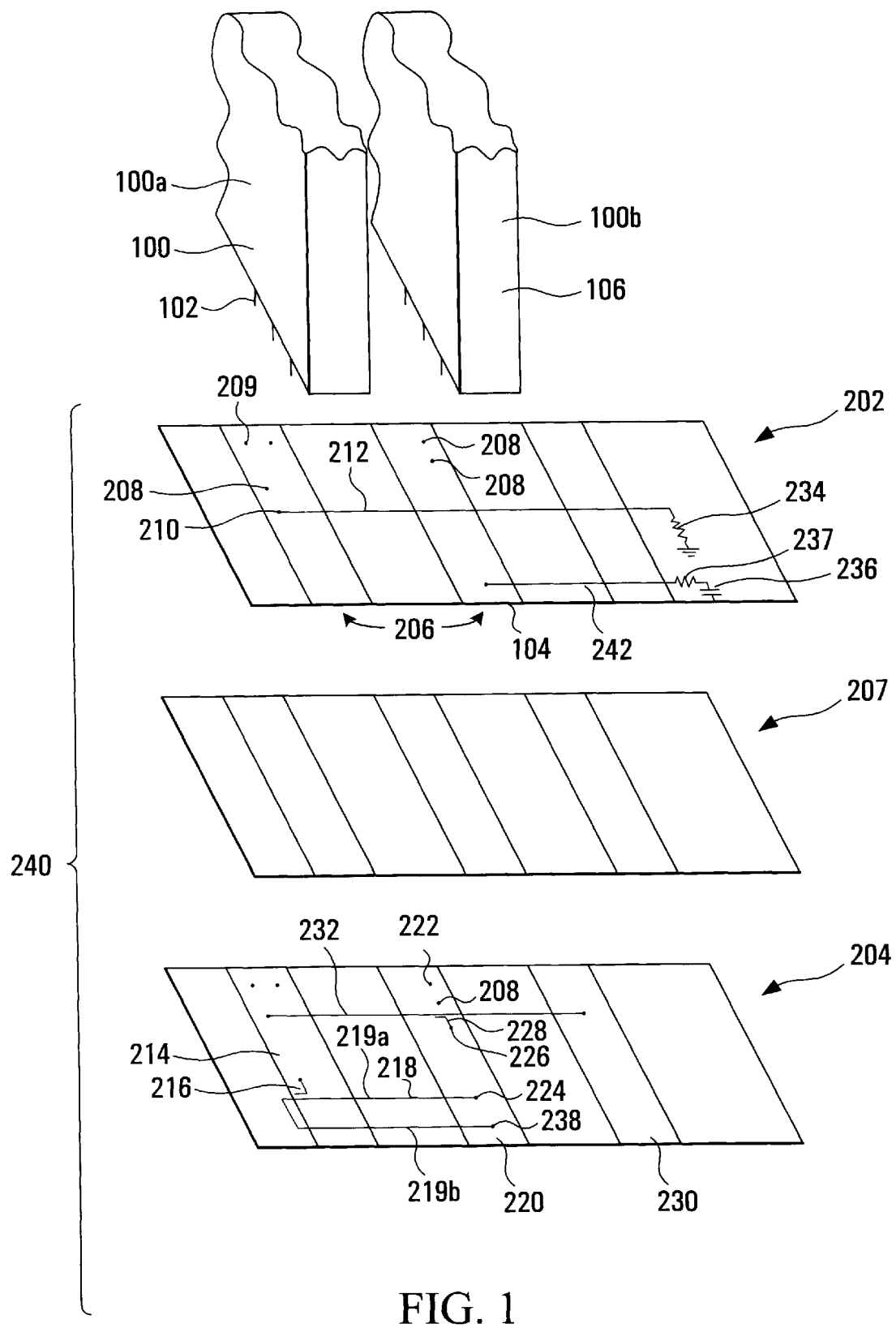
FIG. 1 is an exploded schematic view of a databus in accordance with an embodiment of the present invention.

FIG. 1 shows an exploded perspective view of a databus 240, which is one embodiment of the present invention. The databus comprises alternating layers of etched conducting material 202,204 and insulating material 207. The insulating layer 207 prevents electrical signals from travelling between one conducting layer 202 and another conducting layer 204. As will be appreciated by those skilled in the art, insulating layer 207 could comprise a ground plane sandwiched between two insulating sheets.

The databus 240 has a plurality of slots 206. These slots 206 have a plurality of terminals 208. A circuit pack connector 100 may be plugged into each slot. The circuit pack connector 100 has pins 102 to electrically connect it to the terminals 208 in the slot. These pins allow the circuit pack connector 100 to transmit or receive data to or from the databus 240. When data is transmitted on the databus 240 from a circuit pack in a slot it is received by another slot where another circuit pack is connected.

One of the terminals 208 in a first slot 209 comprises a first terminal 210 for connection to a first source. This first source is a pin on a circuit pack connector 100a in the slot 209 which sends data signals. The first source terminal 210 is connected to a first transmission line 212. The first transmission line 212 extends from the first slot 209. The first transmission line 212 along its entire extent is a part of the first conducting layer 202. A plurality of transmission lines could be associated with each other, forming, for example, at least one pair of differential signal lines and a pair of clock signal lines. The clock signal determines the sampling instant at the sink terminals when signals transmitted on the databus 240 are to be processed. In another implementation, such clock signals may be embedded within the transmitted signals by various encoding schemes, obviating the need for a separately transmitted clock.

Another of the plurality of terminals 208 of the first slot 209 comprises a first sink terminal 214 for connection to a first sink. The first sink terminal 214 is connected to a first sink which is another pin on the circuit pack connector 100a that receives data. It should be noted that the terminals of a slot need not be located on the same conducting layer. For example, first sink terminal 214 is on conducting layer 204 whereas the first source terminal 210 is on conducting layer 202. The first sink terminal 214 is connected to a first tap 216. This first tap 216 extends proximate to a second transmission line 218 that originates from a second slot 220 such that the first tap is coupled with a non-contact coupler, such as a directional or capacitive or inductive coupler, to the second transmission line 218 originating from the second slot 220. Transmission line 218 has an outbound portion 219a comprising the part which passes by taps such as first tap 216 and a return portion 219b which extends from beyond the last tap to the termination of the transmission line. The return portion 219b could be part of the same conducting layer 204 or a different conducting layer, such as conducting layer 202. The second slot also has a plurality of terminals 208. One of this plurality of terminals comprises a second source terminal 224 which is connected to the second transmission line 218. The second source terminal 224 is for connection to a second source which is a pin on the circuit pack connector 100b plugged into the second slot 220. The second transmission line 218 extends from the second slot and is along its entire extent part of the second conducting layer 204. Another of the plurality of terminals in the second slot 220 comprises a second sink terminal 226 for connection to a second sink. The second sink terminal 226 is connected to a second tap 228. The second tap 228 extends proximate to a transmission line 232 originating from another slot 230 such that the second tap 228 receives signals from transmission line 232 originating from slot 230.

Figure 2:
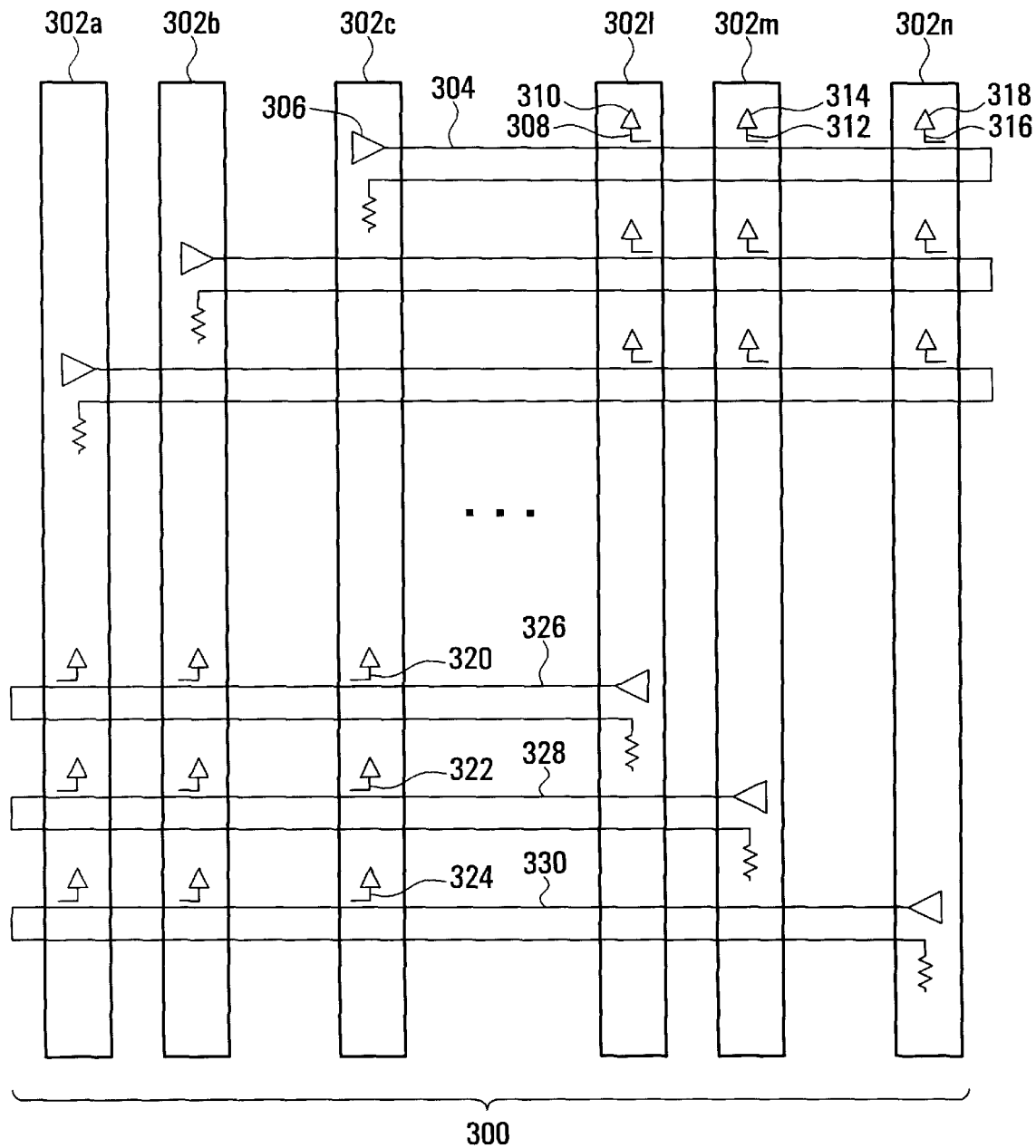
FIG. 2 is a schematic view of a databus in accordance with another embodiment of the present invention.

FIG. 2 shows a schematic of a databus 300 in accordance with another embodiment of the present invention. Databus 300 has a plurality of slots 302a, 302b, . . . 302n. As shown in FIG. 2, this embodiment of the invention allows circuit packs that utilize non-contact coupler technology to send data to and receive data from other packs in slots in the same databus. In other words, although any single transmission line is point-to-multipoint, multi-point to multi-point transmission of signals in the databus is achieved. For example, this is achieved by routing the transmission line 304 from a source terminal 306 in a slot 302c past taps 308, 312, 316 attached to sink terminals 310, 314, 318 in every other slot 302l, 302m, 302n to which multi-point communication is desired for that transmission line 304. As a slot 302c can have a plurality of taps 320, 322, 324, it can receive data from transmission lines 326, 328, 330 originating in a plurality of other slots 302l, 302m, 302n. In this way multi-point to multi-point interconnection is achieved despite use of non-contact, point-to-multipoint coupler technology.

As well it should be noted that a slot could have a plurality of source terminals. Each source terminal would be connected to a different transmission line which could be routed past the same or different slots.

A benefit of the present invention is that the source terminals only transmit data and the sink terminals only receive data. This eliminates contention at the bus level, typically found on a two-way bus. A further benefit of the present invention is that the outbound portion of each transmission line from a particular slot may be etched on a single conductive layer. This reduces signal reflections that could occur when a signal passes from one conductive layer to another and ensures that the delay between signals transmitted simultaneously along differential signal lines and along clock signal lines is minimized. Signal distortion and reflection can prevent a databus from operating at higher bit rates. A minimal delay is important as it helps to ensure that sink terminals receiving a signal from a transmission line will receive the signal within a predictable time period after it is transmitted.

A transmission line is terminated in a number of different ways, for example, the means for termination of a transmission line 218 comprises a termination terminal 238 in the slot where the transmission line originates. In other words, the transmission line 218 loops back around and is terminated on a termination terminal in the same slot where it originated. This provides the advantage of improving fault tolerance in the databus.

Another means for terminating a transmission line is illustrated by transmission line 212 which has a resistor 234 connected to ground. A further means of terminating a transmission line is illustrated by transmission line 242 which has a connection through a resistor 237 to the supply plane 236. This provides the advantage of allowing the termination to be electrically biased to the supply plane 236. Although for illustrative purposes different transmission lines are shown with different types of terminations, typically, for any given databus, all transmission lines will be terminated in the same fashion.

A databus in accordance with the present invention could be implemented on one conducting layer.

Numerous modifications, variations and adaptations may be made to the particular embodiments of the invention described above without departing from the scope of the invention which is defined in the claims.

What is claimed is:

1. A databus comprising:
   at least one conducting layer;
   a plurality of slots;
      each slot having a plurality of terminals;
      one of said plurality of terminals comprising a source terminal for connection to a source;
         said source terminal connected to a transmission line;
            said transmission line, having an outbound portion and a return portion;
            said transmission line, along its outbound portion, being a part of a single conducting layer of said at least one conducting layer;
            said transmission line extending from the slot;
      another of said plurality of terminals comprising a sink terminal for connection to a sink;
         said sink terminal connected to a tap;
            said tap extending proximate to a transmission line originating from a different slot, said tap being coupled with a non-contact coupler to the transmission line originating from a different slot.

2. A databus as claimed in claim 1 wherein said non-contact coupler is a capacitive coupler.

3. A databus as claimed in claim 1 wherein said non-contact coupler is an inductive coupler.

4. The databus of claim 1 wherein said non-contact coupler is a directional coupler.

5. A databus as claimed in claim 1 wherein said transmission line includes a means for termination.

6. The databus of claim 5 in which said means for termination comprises a termination terminal in the slot where said transmission line originates.

7. The databus of claim 5 in which said means of termination comprises a resistor connected to ground.

8. The databus of claim 5 in which said means of termination comprises a connector connecting said transmission line through a resistor to a supply plane.

9. A databus comprising:
   a first conducting layer and a second conducting layer separated by an insulating layer;
   a first slot having a plurality of terminals;
   one of said plurality of terminals comprising a first terminal for connection to a first source;
   said first source terminal connected to a first transmission line;
   said first transmission line extending from the first slot;
   said first transmission line having an outbound portion and a return portion;
   said first transmission line, along its outbound portion, being a part of the first conducting layer;
   another of said plurality of terminals of the first slot comprising a first sink terminal for connection to a first sink;
   said first sink terminal connected to a first tap;
   said first tap extending proximate to a second transmission line originating from a second slot, said first tap being coupled by a non-contact coupler to the transmission line originating from said second slot;
   said second slot having a plurality of terminals;
   one of said plurality of terminals comprising a second source terminal for connection to a second source;
   said second source terminal connecting to said second transmission line;
   said second transmission line having an outbound portion and a return portion;
   said second transmission line extending from the second slot;
   said second transmission line, along its outbound portion, being part of the second conducting layer;
   another of said plurality of terminals in the second slot comprising a second sink terminal for connection to a second sink;
   said second sink terminal connected to a second tap;
   said second tap extending proximate to a transmission line originating from a different slot, such that said second tap is coupled with a non-contact coupler to a transmission line originating from a different slot.

10. A databus as claimed in claim 9 wherein said non-contact coupler is a capacitive coupler.

11. A databus as claimed in claim 9 wherein said non-contact coupler is an inductive coupler.

12. The databus of claim 9 wherein said non-contact coupler is a directional coupler.

13. A databus as claimed in claim 9 wherein said transmission line includes a means for termination.

14. The databus of claim 13 in which said means for termination comprises a termination terminal in the slot where said transmission line originates.

15. The databus of claim 14 wherein a plurality of transmission lines are associated with each other to form at least one differential signal pair.

16. The databus of claim 15 wherein said plurality of transmission lines are associated with at least one clock pair.

17. The databus of claim 13 in which said means of termination comprises a resistor connected to ground.

18. The databus of claim 13 in which said means of termination comprises a connector connecting said transmission line through a resistor to a supply plane.

19. The databus of claim 13 wherein said first slot has at least two source terminals.

20. A network of hardwired connections comprising:
   a first slot having a plurality of terminals;
   a second slot having a plurality of terminals;
   a third slot having a plurality of terminals;
   for said first slot:
      one of said plurality of terminals comprising a first slot source terminal for connection to a source, said first slot source terminal connected to a first transmission line extending from said first slot;
   for said second slot:
      one of said plurality of terminals comprising a second slot source terminal for connection to a source, said second slot source terminal connected to a second transmission line extending from said second slot;
      another of said plurality of terminals comprising a second slot sink terminal for connection to a sink, said second slot sink terminal connected to a second slot tap, said second slot tap extending proximate to said first transmission line, said second slot tap being coupled with a non-contact coupler to said first transmission line; and
   for said third slot:
      one of said plurality of terminals comprising a third slot sink terminal for connection to a sink, said third slot sink terminal connected to a third slot tap, said third slot tap extending proximate to said second transmission line, said third slot tap being coupled with a non-contact coupler to said second transmission line.

* * * * *